US012190902B1

(12) United States Patent
Joshi et al.

(10) Patent No.: US 12,190,902 B1
(45) Date of Patent: Jan. 7, 2025

(54) ADAPTIVE MULTI-STAGE OUTPUT GAIN

(71) Applicant: Amazon Technologies, Inc., Seattle, WA (US)

(72) Inventors: Aditya Sharadchandra Joshi, Sunnyvale, CA (US); Zhouhui Miao, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 326 days.

(21) Appl. No.: 17/672,298

(22) Filed: Feb. 15, 2022

(51) Int. Cl.
*G10L 21/0364* (2013.01)
*G10L 15/05* (2013.01)
*G10L 15/08* (2006.01)
*G10L 15/22* (2006.01)
*G10L 15/30* (2013.01)
*G10L 21/034* (2013.01)
*G10L 25/21* (2013.01)

(52) U.S. Cl.
CPC .......... *G10L 21/0364* (2013.01); *G10L 15/05* (2013.01); *G10L 15/08* (2013.01); *G10L 15/22* (2013.01); *G10L 21/034* (2013.01); *G10L 25/21* (2013.01); *G10L 2015/088* (2013.01); *G10L 2015/223* (2013.01); *G10L 15/30* (2013.01)

(58) Field of Classification Search
CPC ..... G10L 21/0364; G10L 15/05; G10L 15/08; G10L 15/22; G10L 21/034; G10L 25/21; G10L 15/30; G10L 2015/088; G10L 2015/223; G10L 704/251
See application file for complete search history.

(56) References Cited

U.S. PATENT DOCUMENTS

| | | | | |
|---|---|---|---|---|
| 10,068,573 B1* | 9/2018 | Aykac | ...................... | G06F 3/165 |
| 10,461,712 B1* | 10/2019 | Yang | ........................ | G06F 3/165 |
| 11,915,687 B1* | 2/2024 | Smith | ...................... | G10L 15/22 |
| 2013/0183944 A1* | 7/2013 | Mozer | ................. | H04L 12/2818 |
| | | | | 455/414.1 |
| 2015/0016633 A1* | 1/2015 | Gao | ..................... | H04M 1/6041 |
| | | | | 381/107 |
| 2016/0155443 A1* | 6/2016 | Khan | ...................... | G06F 3/167 |
| | | | | 704/275 |
| 2016/0219522 A1* | 7/2016 | Asterjadhi | ........ | H04W 52/0235 |
| 2017/0076720 A1* | 3/2017 | Gopalan | ................. | G10L 15/22 |
| 2017/0090864 A1* | 3/2017 | Jorgovanovic | ....... | H04M 11/007 |
| 2019/0043521 A1* | 2/2019 | Maziewski | ............ | G06F 3/167 |
| 2021/0141818 A1* | 5/2021 | Wu | ..................... | G06F 16/3329 |
| 2021/0391840 A1* | 12/2021 | Wang | ................... | H03G 3/3005 |

(Continued)

*Primary Examiner* — Fariba Sirjani
(74) *Attorney, Agent, or Firm* — Pierce Atwood LLP

(57) ABSTRACT

A system configured to perform audio processing with adaptive multi-stage output gains. For example, an Audio Front End (AFE) component may generate a first output using a fixed gain value in order to improve device arbitration and a second output using an adaptive gain value in order to improve wakeword detection. A wakeword engine may process the second output to determine that a wakeword is present along with start/end times of the wakeword. The AFE component can use the start/end times to determine an amount of wakeword energy represented in the first output, which is sent to a remote device for device arbitration. The AFE component can also use the start/end times to determine an amount of wakeword energy represented in the second output, which can be used to determine the adaptive gain value that is unique to the device.

20 Claims, 10 Drawing Sheets

(56) References Cited

U.S. PATENT DOCUMENTS

2022/0068271 A1* 3/2022 Berg ............... H04S 7/301
2022/0139371 A1* 5/2022 Sharifi ............ G01S 3/8006
                                                    704/231
2022/0358915 A1* 11/2022 Birt ............... G10L 21/0316

* cited by examiner

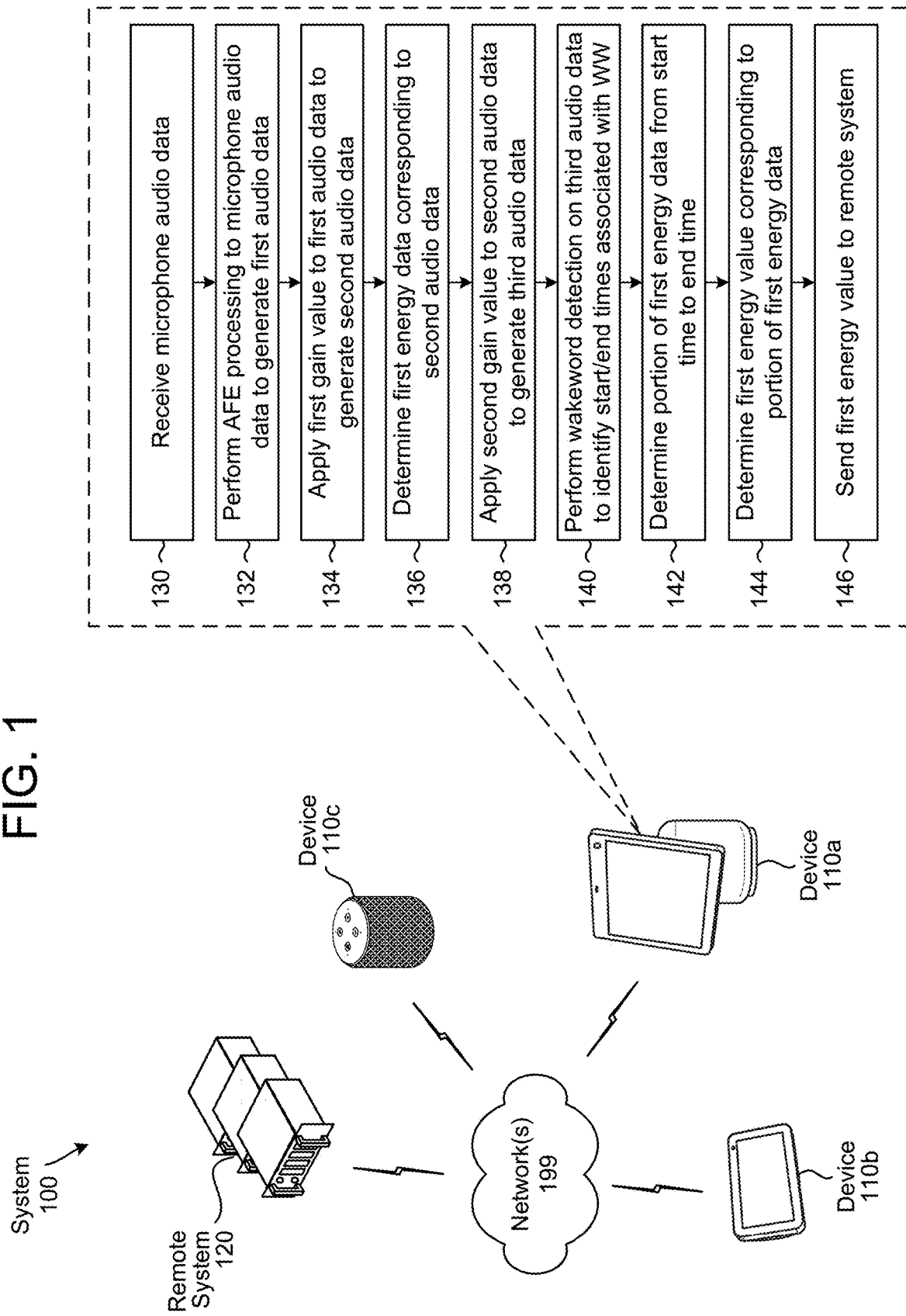

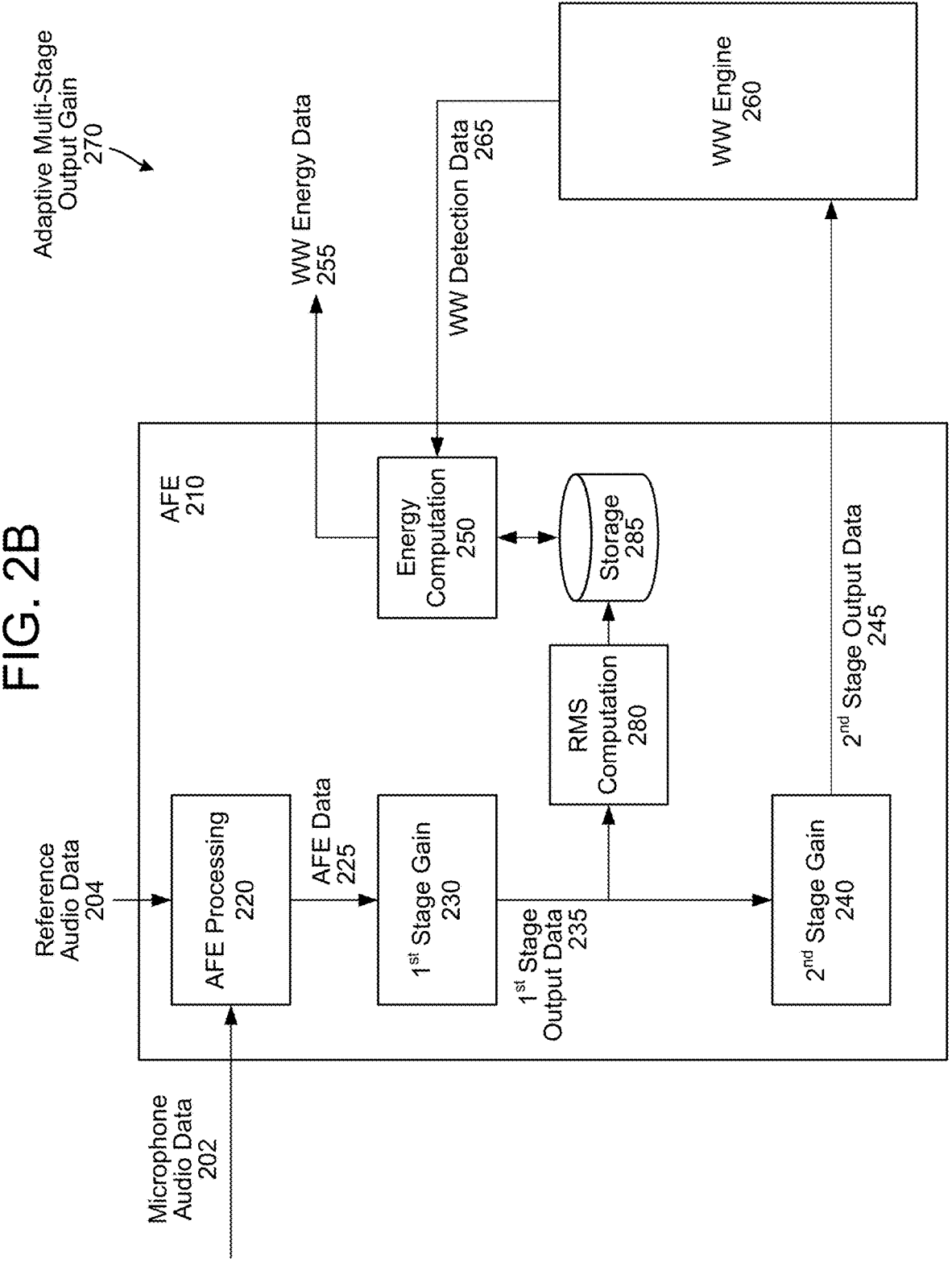

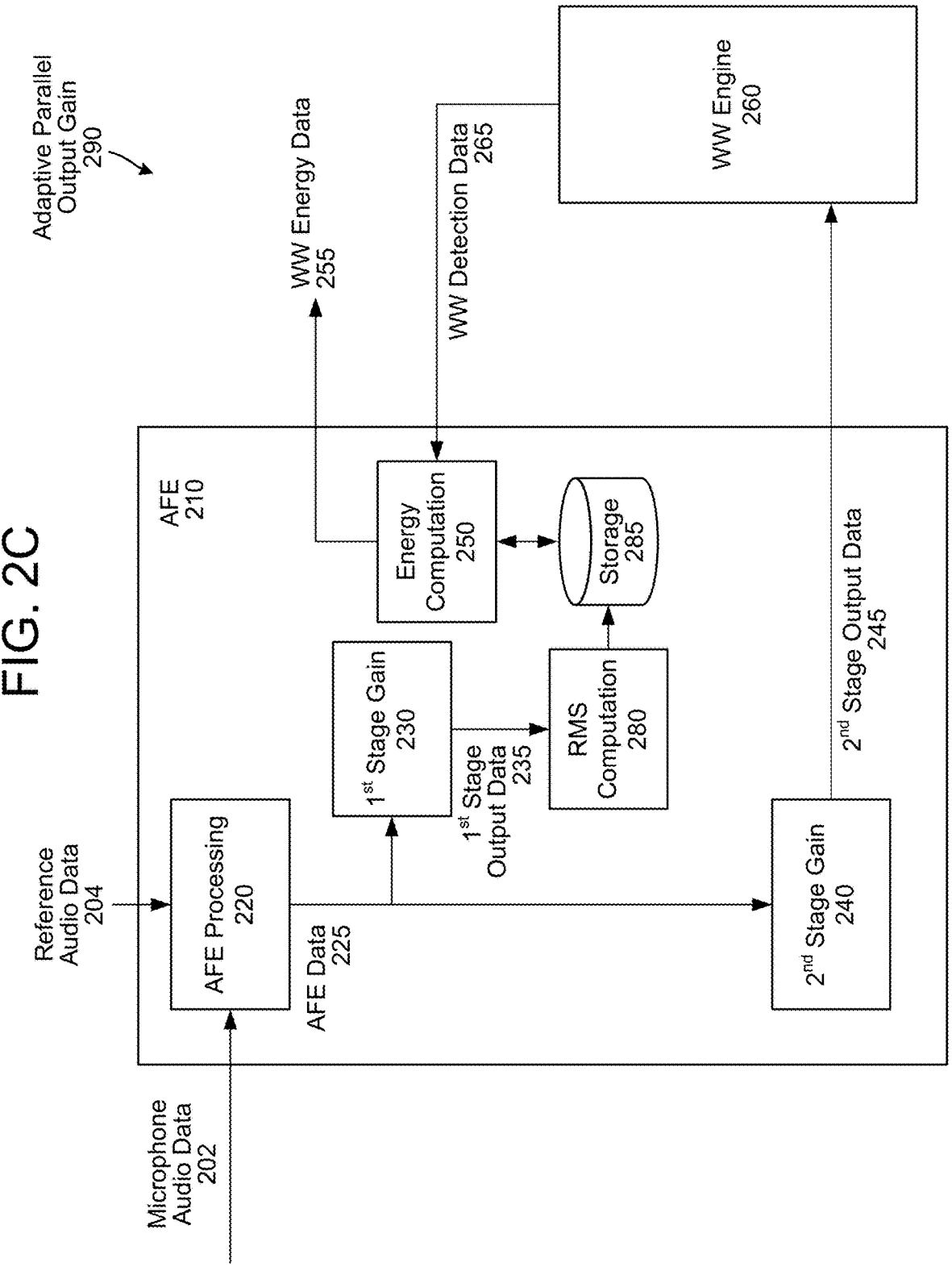

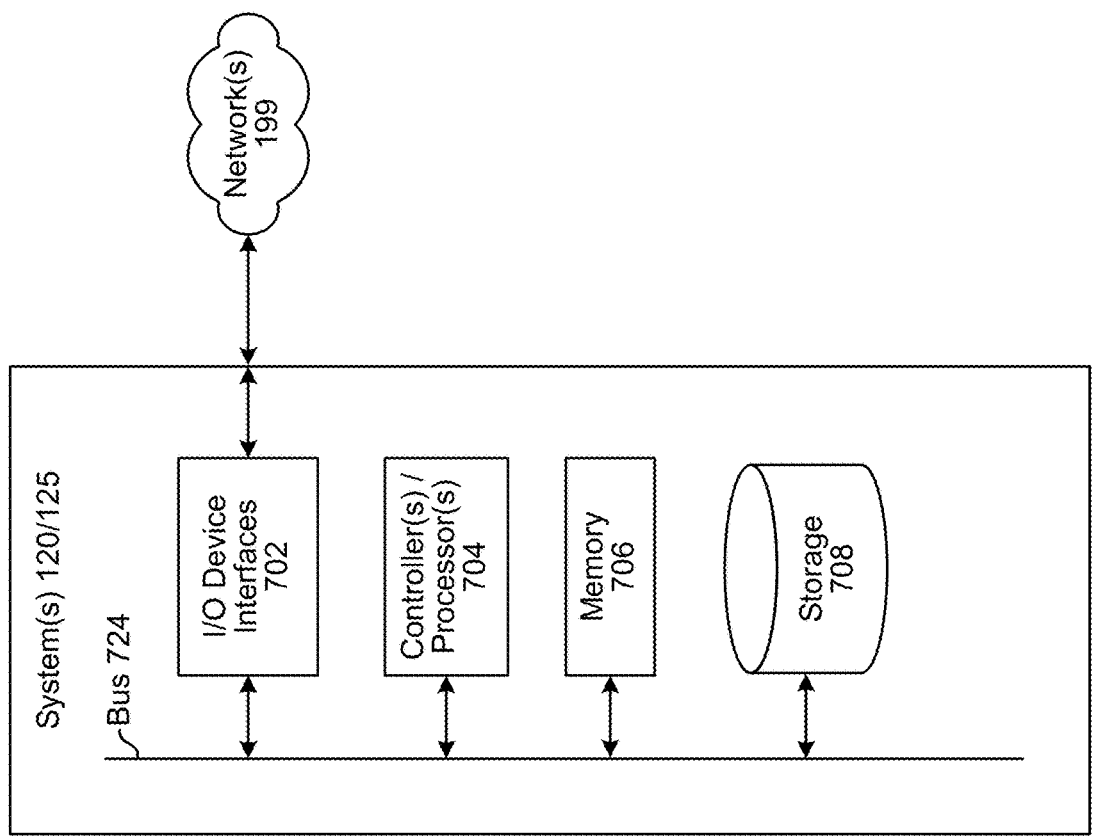

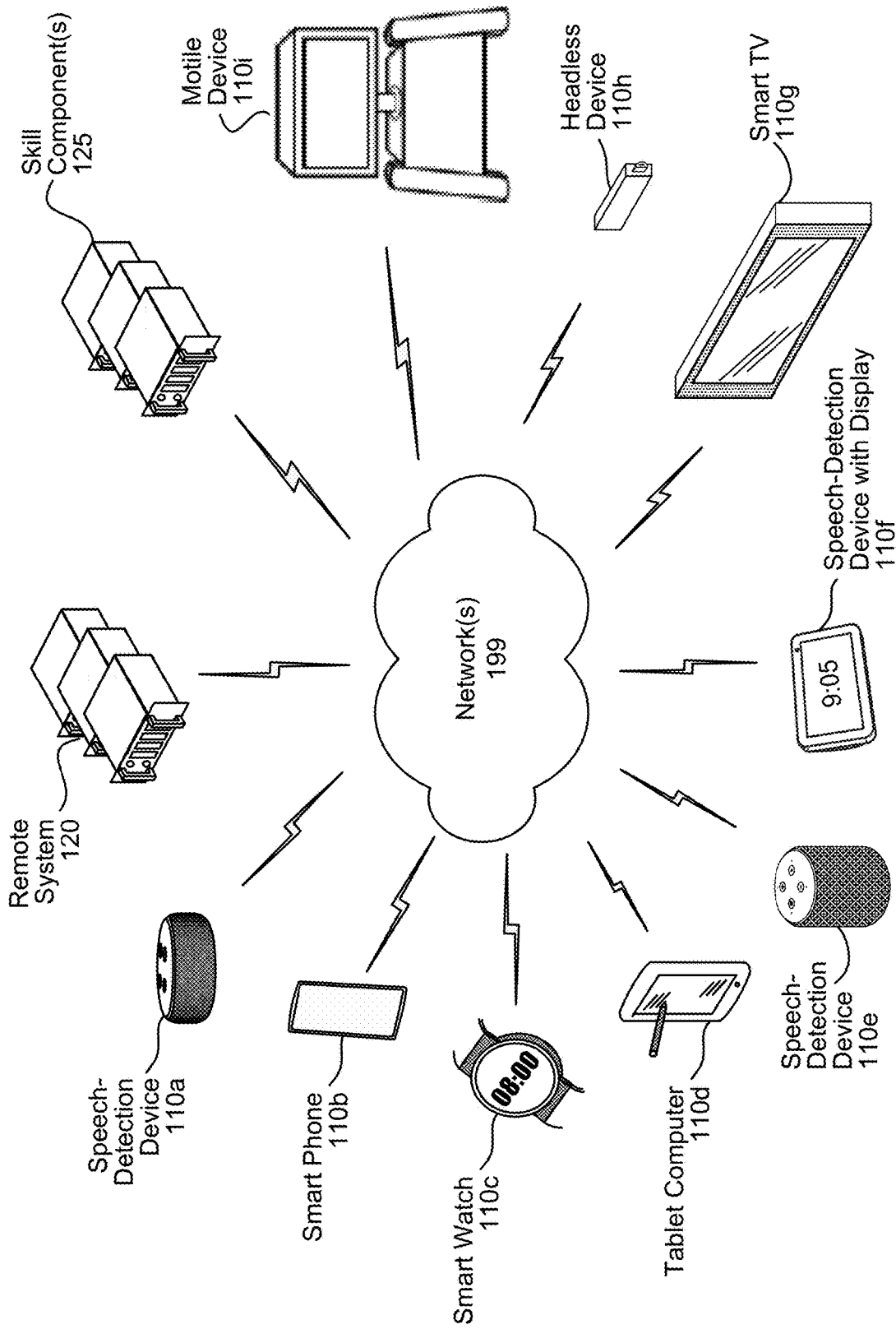

ADAPTIVE MULTI-STAGE OUTPUT GAIN

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 1 is a conceptual diagram illustrating a system configured to generate adaptive multi-stage output gain according to embodiments of the present disclosure.

FIGS. 2A-2C illustrate example component diagrams for generating adaptive multi-stage output gain according to embodiments of the present disclosure.

FIG. 7 is a block diagram conceptually illustrating example components of a system, according to embodiments of the present disclosure.

FIG. 8 illustrates an example of a computer network for use with the overall system, according to embodiments of the present disclosure.

DETAILED DESCRIPTION

Figure 2A:
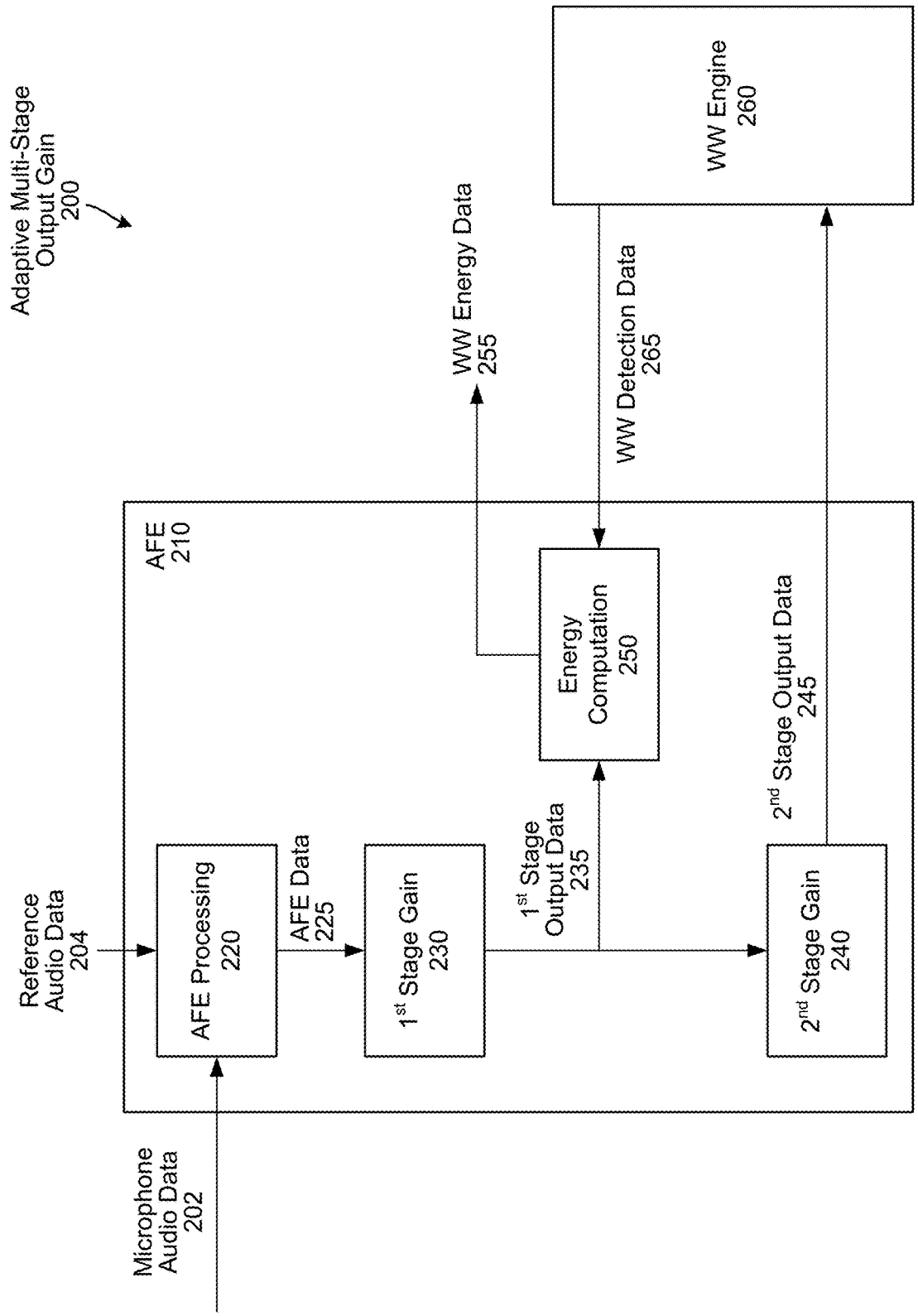

Electronic devices may be used to capture input audio and process input audio data. The input audio data may be used for voice commands and/or sent to a remote device as part of a communication session. To detect a voice command, a first device may perform wakeword detection to determine that a wakeword (e.g., keyword) is present in speech represented in the input audio data. When the first device detects the wakeword, the first device may send a portion of the input audio data corresponding to the voice command to a remote system for speech processing.

In response to the voice command, the remote system may perform an action and/or cause a local device to perform an action. However, if there is a second device in proximity to the first device, the second device may also detect the wakeword and send audio data representing the voice command to the remote system. When the remote system receives the same voice command from multiple devices, the remote system may perform device arbitration to select the local device that is closest to the user that generated the voice command.

In some examples, the remote system performs device arbitration by determining a wakeword energy detected by each device and selecting the highest energy value as a proxy for being closest to the user. To improve device arbitration, the local devices should be calibrated such that output levels are consistent between different types of devices when input levels have a given distance and intensity. Thus, if the first device is closer to the user, first wakeword energy associated with the first device will be greater than second wakeword energy associated with the second device and the remote system will select the first device during device arbitration.

Calibrating the local devices to have consistent output levels based on a given distance and intensity results in wakeword energies that change based on position and/or distance from the user, which improves device arbitration. However, wakeword detection is improved when the output levels are calibrated to a desired output level, such that the output levels for each of the local devices are similar despite different distances to the user. Thus, letting the wakeword energies change based on position and distance from the user will degrade performance of wakeword detection, while keeping the wakeword energies constant at the desired output level will prevent device arbitration from selecting the device closest to the user.

To improve wakeword detection and/or device arbitration, devices, systems and methods are disclosed that perform audio processing with adaptive multi-stage output gains. For example, an Audio Front End (AFE) component may generate a first output using a fixed gain value in order to improve device arbitration and a second output using an adaptive gain value in order to improve wakeword detection. A wakeword engine may process the second output to determine that a wakeword is present along with start/end times of the wakeword. The AFE component can use the start/end times to determine an amount of wakeword energy represented in the first output, which is sent to a remote device for device arbitration. The AFE component can also use the start/end times to determine an amount of wakeword energy represented in the second output, which can be used to determine the adaptive gain value that is unique to the device.

FIG. 1 is a conceptual diagram illustrating a system configured to generate adaptive multi-stage output gain according to embodiments of the present disclosure. As illustrated in FIG. 1, a system 100 may include multiple devices 110a/110b/110c connected across one or more networks 199. In some examples, the devices 110 (local to a user) may also be connected to a remote system 120 across the one or more networks 199, although the disclosure is not limited thereto.

The device 110 may be an electronic device configured to capture and/or receive audio data. For example, the device 110 may include a microphone array configured to generate input audio data, although the disclosure is not limited thereto and the device 110 may include multiple microphones without departing from the disclosure. As is known and used herein, "capturing" an audio signal and/or generating audio data includes a microphone transducing audio waves (e.g., sound waves) of captured sound to an electrical signal and a codec digitizing the signal to generate the microphone audio data. In addition to capturing the input audio data, the device 110 may be configured to receive output audio data and generate output audio using one or more loudspeakers of the device 110. For example, the device 110 may generate output audio corresponding to media content, such as music, a movie, and/or the like.

As illustrated in FIG. 1, the system 100 may include three separate devices 110a-110c, which may be in proximity to each other in an environment, although the disclosure is not limited thereto and any number of devices may be present in the environment without departing from the disclosure. The devices 110a-110c may be speech-enabled, meaning that they are configured to perform voice commands generated by a user. To detect a voice command, the first device 110a may generate input audio data and may perform wakeword detection to determine that a wakeword (e.g., keyword) is present in speech represented in the input audio data.

When the first device 110a detects the wakeword, the first device 110a may send a portion of the input audio data corresponding to the voice command to the remote system 120 for speech processing. However, the second device 110b and the third device 110c may also detect the wakeword and send input audio data corresponding to the voice command to the remote system 120. When the remote system 120 receives the same voice command from multiple devices, the remote system 120 may perform device arbitration to determine which of the devices 110a-110c is closest to the user that generated the voice command.

In some examples, the remote system 120 may perform device arbitration by determining a wakeword energy detected by each of the devices 110a-110c and selecting the highest energy value as a proxy for being closest to the user. To improve device arbitration, the devices 110a-110c may be calibrated such that output levels are consistent between different types of devices when input levels have a given distance and intensity. Thus, if the first device 110a is closer to the user, first wakeword energy associated with the first device 110a will be greater than second wakeword energy associated with the second device 110b and the remote system 120 will select the first device 110a during device arbitration.

Calibrating the devices 110a-110c to have consistent output levels based on a given distance and intensity results in wakeword energies that change based on position and/or distance from the user, which improves device arbitration. However, wakeword detection is improved when the output levels are calibrated to a desired output level, such that the output levels for each of the devices 110a-110c are similar despite different distances to the user. Thus, letting the wakeword energies change based on position and distance from the user will degrade performance of wakeword detection, while keeping the wakeword energies constant at the desired output level will prevent device arbitration from selecting the device closest to the user.

To improve wakeword detection and device arbitration, the device 110 is configured to perform audio processing with adaptive multi-stage output gains. For example, an Audio Front End (AFE) component of the device 110 may generate a first output using a fixed gain value in order to improve device arbitration and a second output using an adaptive gain value in order to improve wakeword detection. A wakeword engine of the device 110 may process the second output to determine that a wakeword is present along with start/end times of the wakeword. The AFE component can use the start/end times to determine an amount of wakeword energy represented in the first output, which may be sent to the remote system 120 or another remote device for device arbitration. The AFE component can also use the start/end times to determine an amount of wakeword energy represented in the second output, which can be used to determine the adaptive gain value that is unique to the device 110.

As illustrated in FIG. 1, the device 110 may receive (130) microphone audio data and optional reference audio data and may perform (132) AFE processing to the microphone audio data to generate first audio data. For example, the AFE processing may include acoustic echo cancellation (AEC) processing, beamforming, adaptive interference cancellation (AIC) processing, residual echo suppression (RES) processing, noise reduction (NR) processing, and/or the like, although the disclosure is not limited thereto.

The AFE component may be configured to generate two different outputs using the first audio data. For example, the AFE component may apply (134) a first gain value to the first audio data to generate second audio data, may determine (136) first energy data corresponding to the second audio data, and may apply (138) a second gain value to the second audio data to generate third audio data. In some examples, the first gain value may correspond to a fixed gain value associated with a type of device (e.g., specific model), while the second gain value may be specific to the device 110 itself, although the disclosure is not limited thereto. For example, the second gain value may be an adaptive gain value determined based on actual wakeword energy measurements collected by the device 110, enabling the AFE component to vary the adaptive gain to maintain a consistent output level, as described below with regard to FIG. 5.

To improve device arbitration, the device 110 may be configured to generate the second audio data using a fixed gain value (e.g., first gain value) that is determined for the type of device (e.g., based on lab calibration and/or testing). For example, the first output may be referred to as a calibrated output and may correspond to consistent output levels between multiple devices and/or different type of devices in response to a wakeword generated at a specific loudness and a specified distance (e.g., wakeword generated with a specific loudness from 12 feet away). Thus, while different types of devices may apply different fixed gain values, the output level of the first stage will be consistent across multiple devices given the same relative position and/or distance to the user. As a result of this calibration, the output levels vary based on a position of the device 110 and/or distance from the user, enabling device arbitration to identify which device is closest to the user based on the wakeword energy.

To improve wakeword detection, however, the device 110 may be configured to generate the third audio data using an adaptive gain value (e.g., second gain value) that is determined by the device 110 based on actual measurements generated by the device 110. For example, as an accuracy of wakeword detection may peak at a desired output level (e.g., −52 dBFS, although the disclosure is not limited thereto), the device 110 may determine the adaptive gain value that results in the third audio data being close to the desired output level. Thus, the adaptive gain value may vary based on a position of the device 110 relative to an average location of the user (e.g., distance from which the wakeword was uttered by the user). In addition, the device 110 adjusts the adaptive gain value based on energy measurements that are specific to the device 110, instead of energy measurements associated with a plurality of devices, a type of device, and/or the like.

As illustrated in FIG. 1, the device 110 may perform (140) wakeword detection on the third audio data to identify start/end times associated with the wakeword. For example, the wakeword engine may be configured to perform wakeword detection and determine whether a wakeword (e.g., keyword) is represented in the third audio data. If the wakeword is detected, the wakeword engine may determine a wakeword boundary corresponding to the wakeword, such as a start time indicating when the wakeword was first detected in the third audio data and an end time indicating when the wakeword is no longer detected in the third audio data. In some examples, the wakeword engine may generate wakeword detection data that indicates that the wakeword is detected, the start time, the end time, and/or the like, although the disclosure is not limited thereto.

In response to the wakeword being detected, the device 110 may determine (142) a portion of the first energy data from the start time to the end time, may determine (144) a first energy value corresponding to the portion of the first energy data, and may send (146) the first energy value to the remote system 120 for device arbitration. However, the disclosure is not limited thereto, and the device 110 may send a portion of the second audio data corresponding to the wakeword to the remote system 120 without departing from the disclosure. Additionally or alternatively, the device 110 may send the first energy value to a local device (e.g., second device 110*b*, third device 110*c*, etc.) to perform device arbitration, receive energy values from local devices in order to perform device arbitration, and/or the like without departing from the disclosure. While FIG. 1 illustrates an example in which the device 110 determines the first energy value corresponding to the wakeword, the disclosure is not limited thereto and the device 110 may determine first data representing characteristics of the portion of the second audio data corresponding to the wakeword without departing from the disclosure.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

As used herein, a frequency band (e.g., frequency bin) corresponds to a frequency range having a starting frequency and an ending frequency. Thus, the total frequency range may be divided into a fixed number (e.g., 256, 512, etc.) of frequency ranges, with each frequency range referred to as a frequency band and corresponding to a uniform size. However, the disclosure is not limited thereto and the size of the frequency band may vary without departing from the disclosure.

The device 110 may include multiple microphones configured to capture sound and pass the resulting audio signal created by the sound to a downstream component. Each individual piece of audio data captured by a microphone may be in a time domain. To isolate audio from a particular direction, the device may compare the audio data (or audio signals related to the audio data, such as audio signals in a sub-band domain) to determine a time difference of detection of a particular segment of audio data. If the audio data for a first microphone includes the segment of audio data earlier in time than the audio data for a second microphone, then the device may determine that the source of the audio that resulted in the segment of audio data may be located closer to the first microphone than to the second microphone (which resulted in the audio being detected by the first microphone before being detected by the second microphone).

Using such direction isolation techniques, a device 110 may isolate directionality of audio sources. A particular direction may be associated with azimuth angles divided into bins (e.g., 0-45 degrees, 46-90 degrees, and so forth). To isolate audio from a particular direction, the device 110 may apply a variety of audio filters to the output of the microphones where certain audio is boosted while other audio is dampened, to create isolated audio corresponding to a particular direction, which may be referred to as a beam. While in some examples the number of beams may correspond to the number of microphones, the disclosure is not limited thereto and the number of beams may be independent of the number of microphones. For example, a two-microphone array may be processed to obtain more than two beams, thus using filters and beamforming techniques to isolate audio from more than two directions. Thus, the number of microphones may be more than, less than, or the same as the number of beams. The beamformer unit of the device may have an adaptive beamformer (ABF) unit/fixed beamformer (FBF) unit processing pipeline for each beam, although the disclosure is not limited thereto.

FIGS. 2A-2C illustrate example component diagrams for generating adaptive multi-stage output gain according to embodiments of the present disclosure. As illustrated in FIG. 2A, an audio front end (AFE) component 210 may receive microphone audio data 202 and reference audio data 204 and generate multi-stage outputs. For example, FIG. 2A illustrates that an AFE processing component 220 may receive the microphone audio data 202 and the reference audio data 204 and perform AFE processing to generate AFE data 225. In some examples, AFE processing may include acoustic echo cancellation (AEC) processing, beamforming, adaptive interference cancellation (AIC) processing, residual echo suppression (RES) processing, noise reduction (NR) processing, and/or the like, although the disclosure is not limited thereto.

As shown in the adaptive multi-stage output gain example 200 illustrated in FIG. 2A, the AFE component 210 is configured to generate two different outputs using the AFE data 225. For example, a first stage gain component 230 may apply a first gain value to the AFE data 225 to generate first stage output data 235, while a second stage gain component 240 may apply a second gain value to the first stage output data 235 to generate second stage output data 245. In some examples, the first gain value may correspond to a fixed gain value associated with a type of device (e.g., specific model), while the second gain value may be specific to the device 110 itself, although the disclosure is not limited thereto. For example, the second gain value may be an adaptive gain value determined based on actual wakeword energy measurements collected by the device 110, enabling the AFE component 210 to vary the adaptive gain to maintain a consistent output level, as described below with regard to FIG. 5.

As illustrated in FIG. 2A, the AFE component 210 may output the second stage output data 245 to a wakeword (WW) engine 260 and receive wakeword detection data 265 from the wakeword engine 260. For example, the wakeword engine 260 may be configured to perform wakeword detection and determine whether a wakeword (e.g., keyword) is represented in the second stage output data 245. If the wakeword is detected, the wakeword engine 260 may determine a wakeword boundary corresponding to the wakeword, such as a start time indicating when the wakeword was first detected in the second stage output data 245 and an end time indicating when the wakeword is no longer detected in the second stage output data 245. Thus, the wakeword detection data 265 may indicate that the wakeword is detected, the start time, the end time, and/or the like, although the disclosure is not limited thereto. In some examples, the wakeword detection data 265 my include AFE timestamps, indicating the start time and the end time relative to a clock associated with the AFE component 210, as will be described in greater detail below with regard to FIG. 4.

In the example illustrated in FIG. 2A, an energy computation component 250 receives the wakeword detection data 265 from the wakeword engine 260 and generates wakeword energy data 255 using the wakeword detection data 265 and the first stage output data 235. For example, the energy computation component 250 may use the wakeword detection data 265 to select a portion of the first stage output data 235 and may determine the wakeword energy data 255 based on the portion of the first stage output data 235 that corresponds to the wakeword. Thus, the wakeword energy data 255 may indicate an amount of wakeword energy represented in the first stage output data 235, although the disclosure is not limited thereto.

While FIG. 2A illustrates an example in which the AFE component 210 outputs the wakeword energy data 255, the disclosure is not limited thereto. In some examples, the AFE component 210 may output the wakeword energy data 255, the first stage output data 235, the portion of the first stage output data 235 corresponding to the wakeword, feature data corresponding to the portion of the first stage output data 235, and/or the like without departing from the disclosure. Additionally or alternatively, while FIG. 2A illustrates the AFE component 210 outputting the second stage output data 245 only to the wakeword engine 260, the disclosure is not limited thereto and the AFE component 210 may output the second stage output data 245 to additional components without departing from the disclosure.

In the example illustrated in FIG. 2A, the AFE component 210 generates the first stage output data 235 and the first stage output data 235 is used at a later time (e.g., after the wakeword is detected) to generate the wakeword energy data 255. For example, the energy computation component 250 may include a buffer or other storage component configured to store at least a portion of the first stage output data 235 while the wakeword engine 260 is performing wakeword detection. To illustrate an example, the energy computation component 250 may store a portion of the first stage output data 235 representing most recent audio frames corresponding to a fixed period of time, enabling the energy computation component 250 to receive the wakeword detection data 265 and retroactively calculate the wakeword energy data 255 from the start time associated with the wakeword.

FIG. 2B illustrates a different example in which the AFE component 210 generates energy values from the first stage output data 235 and stores the energy values in a buffer or other storage component instead of storing the first stage output data 235. As shown in the adaptive multi-stage output gain example 270 illustrated in FIG. 2B, the AFE component 210 is configured to generate two different outputs using the AFE data 225. However, instead of storing the first stage output data 235 itself, the AFE component 210 includes a root-mean-square (RMS) computation component 280 that is configured to determine RMS values corresponding to the first stage output data 235 and store the RMS values in a storage component 285. However, the disclosure is not limited thereto and the RMS computation component 280 may perform other calculations, extract feature data, and/or the like without departing from the disclosure.

The storage component 285 may store the RMS values indicating energy values for most recent audio frames corresponding to a fixed period of time, enabling the energy computation component 250 to receive the wakeword detection data 265 and retroactively calculate the wakeword energy data 255 from the start time associated with the wakeword. Thus, the device 110 may use the second stage output data 245 to perform wakeword detection and generate the wakeword detection data 265, then estimate the wakeword energy data 255 for a portion of the first stage output data 235 that corresponds to the wakeword.

FIG. 2C illustrates an example in which the AFE component 210 includes two output stages in parallel according to embodiments of the present disclosure. As shown in the adaptive parallel output gain example 290 illustrated in FIG. 2C, the AFE component 210 is configured to generate two different outputs using the AFE data 225, similar to the examples described above. However, while the previous examples illustrate the first stage gain component 230 and the second stage gain component 240 in a series configuration (e.g., output of the first stage gain component 230 is input to the second stage gain component 240), the parallel output gain example 290 illustrate the first stage gain component 230 and the second stage gain component 240 in a parallel configuration.

As illustrated in FIG. 2C, the first stage gain component 230 may apply the first gain value to the AFE data 225 to generate the first stage output data 235, as described in greater detail above. However, instead of applying the second gain value to the first stage output data 235, the second stage gain component 240 may apply the second gain value to the AFE data 225 to generate the second stage output data 245. For example, as the first gain value may be a fixed value, the second gain value applied in the parallel output gain example 290 may be equal to a sum of the first gain value and the second gain value applied in the previous examples, although the disclosure is not limited thereto.

Figure 3:
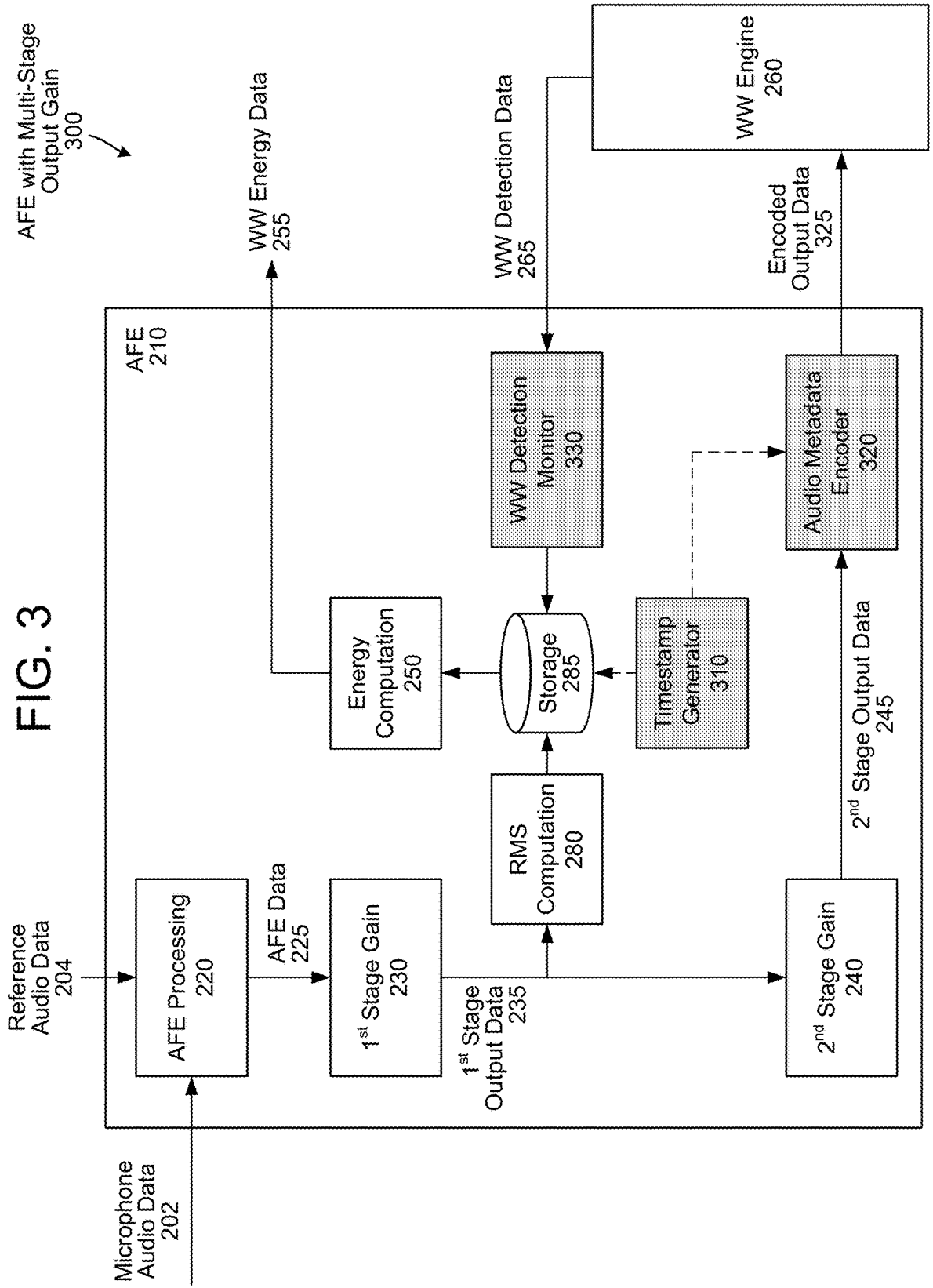
FIG. 3 illustrates an example component diagram for an audio front end (AFE) component with multi-stage output gain according to embodiments of the present disclosure.

FIG. 3 illustrates an example component diagram for an audio front end (AFE) component with multi-stage output gain according to embodiments of the present disclosure. As illustrated in FIG. 3, in some examples the AFE component 210 may include additional components to enable synchronization with the wakeword engine 260. For example, the AFE component 210 may enable time synchronization by synchronizing a first clock signal used by the AFE component 210 with a second clock signal used by the wakeword engine 260, such that the AFE component 210 can convert from the second clock signal back to the first clock signal. However, time synchronization requires that the clocks and/or audio signals be aligned in both time and frequency, including adjusting for a time offset (e.g., difference in samples between the first clock signal and the second clock signal), a frequency offset (e.g., clock frequency drift between the first clock signal and the second clock signal), different sampling frequencies (e.g., difference in sampling frequencies between the AFE component 210 and the wakeword engine 260), and/or the like, although the disclosure is not limited thereto.

In other examples, the AFE component 210 may enable audio frame synchronization by synchronizing AFE sample indexes associated with the AFE component 210 with WW sample indexes associated with the wakeword engine 260. For example, the AFE component 210 and/or the wakeword engine 260 may be configured to convert from an AFE sample index to a WW sample index and vice versa. However, as the AFE component 210 and the wakeword engine 260 start processing the audio frames at different times, a first length of an AFE audio frame (e.g., 8 ms) may be different from a second length of a WW audio frame (e.g., 10 ms), and/or other differences between the two components, the AFE sample indexes may not align with the WW sample indexes.

In the example illustrated in FIG. 3, the AFE component 210 may enable audio frame synchronization by maintaining AFE sample indexes between the AFE component 210 and the wakeword engine 260. For example, the AFE component 210 may perform audio encoding to send timestamp information (e.g., AFE sample indexes) to the wakeword engine 260 on a per frame basis, enabling the wakeword engine 260 to generate the WW detection data 265 with reference to the AFE sample indexes, although the disclosure is not limited thereto.

In the AFE with multi-stage output gain example 300 illustrated in FIG. 3, the AFE component 210 may include a timestamp generator 310, which is configured to generate timestamp data indicating an AFE sample index for each audio frame, along with an audio metadata encoder 320, which is configured to encode the second stage output data 245 with the timestamp data to generate encoded output data 325. For example, the timestamp generator 310 may generate a first timestamp that indicates a first AFE sample index corresponding to a first audio frame in the first stage output data 235 and to a first audio frame in the second stage output data 245, a second timestamp that indicates a second AFE sample index corresponding to a second audio frame in the first stage output data 235 and to a second audio frame in the second stage output data 245, and so on for a plurality of audio frames.

Based on the timestamp data, the storage component 285 may store a first association between the first timestamp and a first RMS value that indicates an amount of energy represented in the first audio frame in the first stage output data 235, a second association between the second timestamp and a second RMS value that indicates an amount of energy represented in the second audio frame in the first stage output data 235, and so on for each of the plurality of audio frames.

Similarly, the audio metadata encoder 320 may generate the encoded output data 325 by encoding the first timestamp in the first audio frame in the second stage output data 245, encoding the second timestamp in the second audio frame in the second stage output data 245, and so on for each of the plurality of audio frames. For example, the audio metadata encoder 320 may encode the timestamp values in the Least Significant Bits (LSBs) of the encoded output data 325. Thus, the first timestamp indicates the first AFE sample index that corresponds to both the first audio frame in the first stage output data 235 and the first audio frame in the second stage output data 245, the second timestamp indicates the second AFE sample index that corresponds to both the second audio frame in the first stage output data 235 and the second audio frame in the second stage output data 245, and so on.

As illustrated in FIG. 3, the AFE component 210 may send the encoded output data 325 to the wakeword engine 260 and the wakeword engine 260 may use the encoded output data 325 to generate the WW detection data 265, as described in greater detail below with regard to FIG. 4. In some examples, the AFE component 210 may include a WW detection monitor component 330 that is configured to receive the WW detection data 265 from the WW engine 260 and trigger the energy computation component 250 to generate the WW energy data 255. For example, the WW detection monitor component 330 may receive the WW detection data 265 and determine that a wakeword was detected by the WW engine 260.

In response to determining that the wakeword was detected, the WW detection monitor component 330 may determine a wakeword boundary indicated by the WW detection data 265. In some examples, the wakeword boundary may indicate a third timestamp (e.g., third AFE sample index) corresponding to a beginning of the wakeword and a fourth timestamp (e.g., fourth AFE sample index) corresponding to an end of the wakeword, such that the wakeword corresponds to a series of timestamps from the third timestamp to the fourth timestamp. However, the disclosure is not limited thereto, and in other examples the wakeword boundary may indicate a range of timestamps, may list timestamps corresponding to the wakeword, and/or the like without departing from the disclosure.

After determining the wakeword boundary, the WW detection monitor component 330 may send the wakeword boundary to the storage component 285. Using the wakeword boundary, the storage component 285 may identify a series of RMS values corresponding to the wakeword and may send the series of RMS values to the energy computation component 250. The energy computation component 250 may use the series of RMS values to generate the WW energy data 255, as described in greater detail above.

Figure 4:
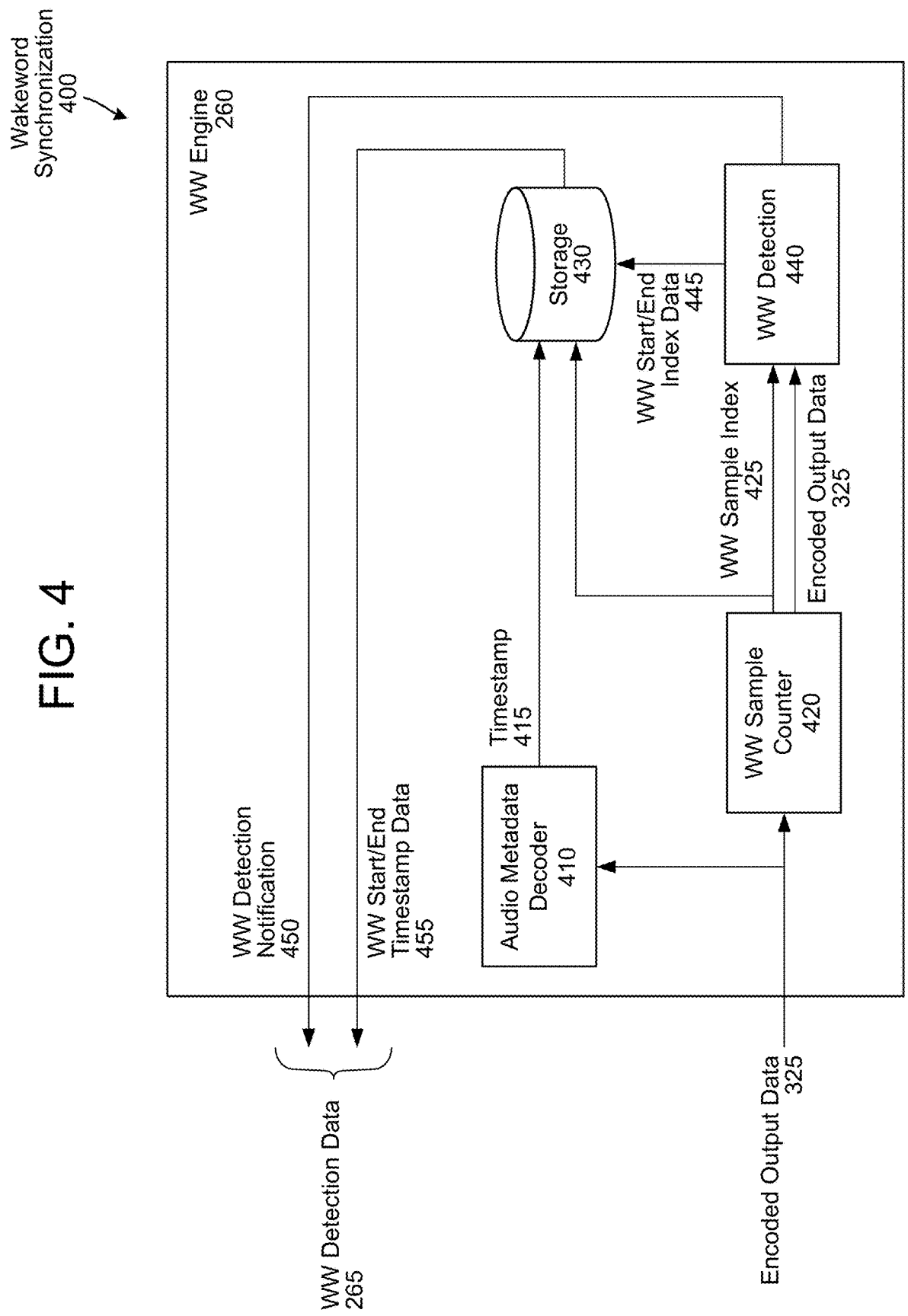
FIG. 4 illustrates an example component diagram for wakeword synchronization according to embodiments of the present disclosure.

FIG. 4 illustrates an example component diagram for wakeword synchronization according to embodiments of the present disclosure. As described above, the AFE component 210 may encode the second stage output data 245 with the timestamp data (e.g., AFE sample indexes) to generate the encoded output data 325 that is sent to the wakeword engine 260. As illustrated in FIG. 4, the wakeword engine 260 may perform wakeword synchronization 400 by decoding the timestamp data and maintaining an association between the timestamp data and WW sample indexes. For example, the wakeword engine 260 may include an audio metadata decoder 410 that is configured to receive the encoded output data 325 and extract a timestamp 415 for a current audio frame of the encoded output data 325. In addition, the wakeword engine 260 may include a wakeword sample counter 420 that is configured to generate a WW sample index 425 corresponding to the current audio frame of the encoded output data 325.

The audio metadata decoder 410 may output the timestamp 415 to a storage component 430 (e.g., buffer). In addition, the wakeword sample counter 420 may output the WW sample index 425 to the storage component 430. Thus, the storage component 430 may store an association between the timestamp 415 (e.g., AFE sample index) and the WW sample index 425 for the current audio frame of the encoded output data 325.

In some examples, the storage component 430 may store an association in response to receiving an incoming timestamp 415 from the audio metadata decoder 410. For example, the storage component 430 may receive a first WW sample index prior to receiving a first timestamp, resulting in the storage component 430 storing a first association between the first timestamp and the first WW sample index. Then the storage component 430 may receive a second WW sample index prior to receiving a second timestamp, resulting in the storage component 430 storing a second association between the second timestamp and the second WW sample index. Thus, each time the storage component 430 receives an incoming timestamp, the storage component 430 identifies a most recently received WW sample index 425 and stores an association between the incoming timestamp and the most recently received WW sample index 425. However, the disclosure is not limited thereto and the storage component 430 may store an association in response to receiving the WW sample index 425 without departing from the disclosure.

A wakeword detection component 440 may perform wakeword detection to determine whether a wakeword is represented in the encoded output data 325. When the wakeword detection component 440 determines that a wakeword is represented in the encoded output data 325, the wakeword detection component 440 may generate a WW detection notification 450, may determine a portion of the encoded output data 325 in which the wakeword is represented, and may generate WW start/end index data 445 corresponding to the portion of the encoded output data 325. For example, the WW start/end index data 445 may include a start WW sample index corresponding to a beginning of the wakeword (e.g., first audio frame of the portion of the encoded output data 325) and an end WW sample index corresponding to an ending of the wakeword (e.g., final audio frame of the portion of the encoded output data 325).

The wakeword detection component 440 may output the WW start/end index data 445 to the storage component 430 and the storage component 430 may use the previously stored associations to convert the WW start/end index data 445 to WW start/end timestamp data 455. For example, if the WW start/end index data 445 indicates that the start WW sample index is the second WW sample index, the storage component 430 may retrieve the second association and generate WW start/end timestamp data 455 indicating that the start AFE sample index is the second timestamp. Thus, the WW detection data 265 sent back to the AFE component 210 indicates the wakeword boundary with reference to the AFE clock associated with the AFE component 210, not the WW clock associated with the wakeword engine 260.

Figure 5:
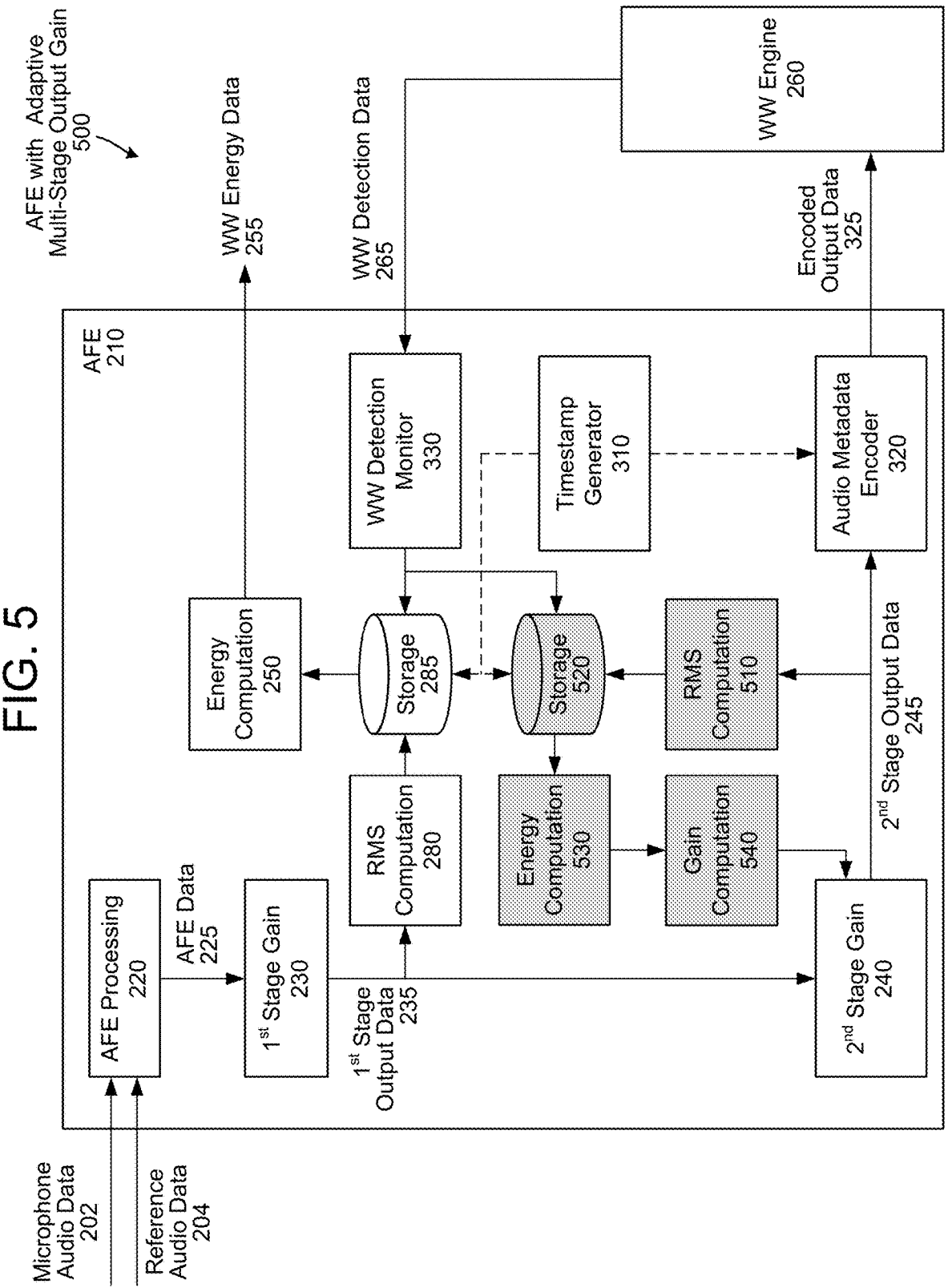
FIG. 5 illustrates an example component diagram for an AFE component with adaptive multi-stage output gain according to embodiments of the present disclosure.

FIG. 5 illustrates an example component diagram for an AFE component with adaptive multi-stage output gain according to embodiments of the present disclosure. As illustrated in FIG. 5, an AFE with adaptive multi-stage output gain 500 may include all of the components described above with regard to FIG. 3 as well as additional components that enable the AFE component 210 to generate wakeword energy data associated with the second stage output data 245. For example, the additional components may estimate an amount of wakeword energy represented in the portion of the second stage output data 245 that corresponds to the wakeword.

As illustrated in FIG. 5, the AFE component 210 may include a second root-mean-square (RMS) computation component 510 that is configured to determine RMS values corresponding to the second stage output data 245 and store the RMS values in a second storage component 520. However, the disclosure is not limited thereto and the RMS computation component 510 may perform other calculations, extract feature data, and/or the like without departing from the disclosure. The second storage component 520 may store the RMS values indicating energy values for most recent audio frames corresponding to a fixed period of time, enabling a second energy computation component 530 to retroactively calculate the wakeword energy data from the start time associated with the wakeword.

As described above with regard to FIG. 3, the AFE component 210 may include a WW detection monitor component 330 that is configured to receive the WW detection data 265 from the WW engine 260 and trigger the energy computation component 250 to generate the WW energy data 255. For example, the WW detection monitor component 330 may receive the WW detection data 265, determine that a wakeword was detected by the WW engine 260, determine a wakeword boundary indicated by the WW detection data 265, and then send the wakeword boundary to the storage component 285. Using the wakeword boundary, the storage component 285 may identify a first series of RMS values corresponding to the wakeword and may send the first series of RMS values to the energy computation component 250, which may use the first series of RMS values to generate the WW energy data 255, as described in greater detail above.

In some examples, the WW detection monitor component 330 may also send the wakeword boundary to the second storage component 520, causing the second storage component 520 to identify a second series of RMS values corresponding to the wakeword and send the second series of RMS values to the second energy computation component 530. The second energy computation component 530 may use the second series of RMS values to generate WW energy data corresponding to the second stage output data 245, which may be output to a gain computation component 540.

After determining the amount of wakeword energy represented in portions of the second stage output data 245 over time, the gain computation component 540 may perform long term tracking of the wakeword energy to generate an adaptive gain value that brings an energy level of the second stage output data 245 close to a desired output level (e.g., −52 dBFS, although the disclosure is not limited thereto). Thus, the AFE component 210 adjusts the adaptive gain value based on energy measurements that are specific to the device 110, instead of energy measurements associated with a plurality of devices, a type of device, and/or the like.

The AFE component 210 selects the adaptive gain value based on the desired output level in order to improve wakeword detection performed by the wakeword engine 260. For example, as an accuracy of wakeword detection performed by the wakeword engine 260 may peak at the desired output level, the AFE component 210 may determine the adaptive gain value that results in the second stage output data 245 being close to the desired output level. Thus, the adaptive gain value may vary based on a position of the device 110 relative to an average location of the user (e.g., distance from which the wakeword was uttered by the user).

To illustrate an example, a first device 110*a* may be positioned in a corner away from an average location of the user, causing a first AFE component 210*a* of the first device 110*a* to detect relatively low wakeword energy in the first stage output data 235 and select a first adaptive gain value that is relatively high in order to amplify the second stage output data 245 to the desired output level. In contrast, a second device 110*b* may be positioned near the average location of the user, causing a second AFE component 210*b* of the second device 110*b* to detect relatively high wakeword energy in the first stage output data 235 and select a second adaptive gain value that is relatively low in order to amplify the second stage output data 245 to the desired output level. Based on the wakeword energy detected in the second stage output data 245 over time, the AFE components 210 may increase or decrease the adaptive gain values to bring the second stage output data 245 closer to the desired output level.

In the example described above, both the first AFE component 210*a* and the second AFE component 210*b* will generate the second stage output data 245 near the desired output level, despite the difference in location and distance to the user. Thus, even though the second device 110*b* is noticeably closer to the average location of the user than the first device 110*a*, the second stage output data 245 will be similar for both devices. This improves the output of wakeword detection performed by the wakeword engine 260 of both devices 110*a*/110*b*.

The device 110 and/or the remote system 120 may be configured to perform device arbitration to determine which device of a plurality of devices is closest to the user based on respective wakeword energy values generated by each of the devices. While having a consistent output level regardless of position and distance from user improves the performance of the wakeword engine 260, this consistent output makes it difficult for the device 110 and/or remote system 120 to select between multiple devices during device arbitration.

To improve device arbitration, the AFE component 210 may be configured to generate the first stage output data 235 using a fixed gain value that is determined for the type of device (e.g., based on lab calibration and/or testing). For example, the first stage gain component 230 may be referred to as a calibrated output gain stage and may apply a fixed gain value that results in a consistent output between multiple devices (or type of devices) in response to a wakeword generated at a specific loudness and a specified distance (e.g., wakeword generated with a specific loudness from 12 feet away). Thus, while different types of devices may apply different fixed gain values, the output level of the first stage output data 235 will be consistent across multiple devices given the same relative position and/or distance to the user.

While the calibration process results in the output level of the first stage output data 235 being consistent given the same distance to the user, the position of the user may vary relative to multiple devices located in proximity to each other in an environment. Using the example described above, the first device 110a that is located in a corner away from an average location of the user would be positioned a first distance from the user, whereas the second device 110b that is located near the average location of the user would be positioned a second distance from the user that is closer than the first distance. Thus, the first device 110a may generate the first stage output data 235 at a first output level (e.g., based on the first distance) and the second device 110b may generate the first stage output data 235 at a second output level (e.g., based on the second distance). As a result of being closer to the user, the second output level (e.g., wakeword energy of the first stage output data 235 generated by the second device 110b) may be noticeably higher than the first output level (e.g., wakeword energy of the first stage output data 235 generated by the first device 110a), resulting in the second device 110b being selected over the first device 110a during device arbitration.

Figure 6:
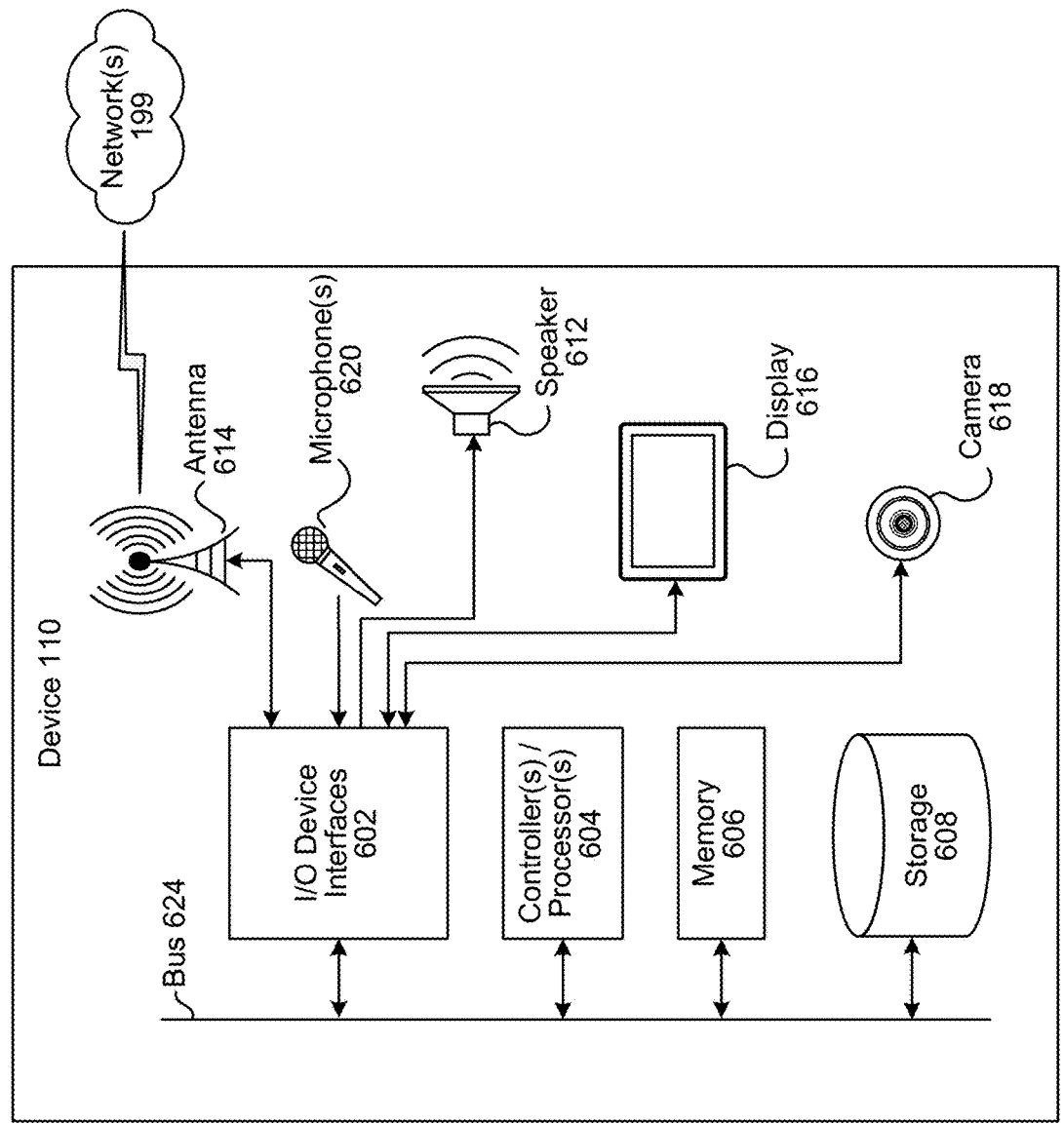
FIG. 6 is a block diagram conceptually illustrating example components of a device, according to embodiments of the present disclosure.

While FIG. 6 illustrates an example in which the second energy computation component 530 generates the WW energy data corresponding to the second stage output data 245 and sends the WW energy data to the gain computation component 540, the disclosure is not limited thereto. In some examples, the second energy computation component 530 may send the WW energy data to a remote device and/or the remote system 120 without departing from the disclosure. For example, the AFE component 210 may send the WW energy data to the remote system 120 and the remote system 120 may store wakeword energies in a database in order to test and improve functionality of the AFE component 120 and/or other components.

FIG. 6 is a block diagram conceptually illustrating a device 110 that may be used with the remote system 120. FIG. 7 is a block diagram conceptually illustrating example components of a remote device, such as the remote system 120, which may assist with ASR processing, NLU processing, etc.; and a skill component 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The remote system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as one or more remote systems 120 for performing ASR processing, one or more remote systems 120 for performing NLU processing, and one or more skill component 125, etc. In operation, each of these systems may include computer-readable and computer-executable instructions that reside on the respective device (120/125), as will be discussed further below.

Each of these devices (110/120/125) may include one or more controllers/processors (604/704), which may each include a central processing unit (CPU) for processing data and computer-readable instructions, and a memory (606/706) for storing data and instructions of the respective device. The memories (606/706) may individually include volatile random access memory (RAM), non-volatile read only memory (ROM), non-volatile magnetoresistive memory (MRAM), and/or other types of memory. Each device (110/120/125) may also include a data storage component (608/708) for storing data and controller/processor-executable instructions. Each data storage component (608/708) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (602/702).

Computer instructions for operating each device (110/120/125) and its various components may be executed by the respective device's controller(s)/processor(s) (604/704), using the memory (606/706) as temporary "working" storage at runtime. A device's computer instructions may be stored in a non-transitory manner in non-volatile memory (606/706), storage (608/708), or an external device(s). Alternatively, some or all of the executable instructions may be embedded in hardware or firmware on the respective device in addition to or instead of software.

Each device (110/120/125) includes input/output device interfaces (602/702). A variety of components may be connected through the input/output device interfaces (602/702), as will be discussed further below. Additionally, each device (110/120/125) may include an address/data bus (624/724) for conveying data among components of the respective device. Each component within a device (110/120/125) may also be directly connected to other components in addition to (or instead of) being connected to other components across the bus (624/724).

Referring to FIG. 6, the device 110 may include input/output device interfaces 602 that connect to a variety of components such as an audio output component such as a speaker 612, a wired headset or a wireless headset (not illustrated), or other component capable of outputting audio. The device 110 may also include an audio capture component. The audio capture component may be, for example, a microphone 620 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 616 for displaying content. The device 110 may further include a camera 618.

Via antenna(s) 614, the input/output device interfaces 602 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (602/702) may also include communication components that allow data to be exchanged between devices such as different physical servers in a collection of servers or other components.

The components of the device 110, the remote system 120, and/or a skill component 125 may include their own dedicated processors, memory, and/or storage. Alternatively, one or more of the components of the device 110, the remote system 120, and/or a skill component 125 may utilize the I/O interfaces (602/702), processor(s) (604/704), memory (606/706), and/or storage (608/708) of the device(s) 110, system 120, or the skill component 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the remote system 120, and a skill component 125, as described herein, are illustrative, and may be located as a stand-alone device or may be included, in whole or in part, as a component of a larger device or system.

As illustrated in FIG. 8, multiple devices (110a-110k, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a speech-detection device 110e, a display device 110f, a smart television 110g, a headless device 110h, and/or a motile device 110i may be connected to the network(s) 199 through a wireless service provider, over a Wi-Fi or cellular network connection, or the like. Other devices are included as network-connected support devices, such as the remote system 120, the skill component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the remote system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an audio front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
- determining, by a first component of a first device, first audio data representing speech input received from at least one microphone of the first device;
- performing, by the first component, audio processing to the first audio data to generate second audio data;
- applying a first gain value to the second audio data to generate third audio data;
- determining, using the third audio data, first energy data including a first energy value corresponding to a first audio frame of the third audio data, the first audio frame associated with a first timestamp;
- applying a second gain value to the third audio data to generate fourth audio data;
- encoding the fourth audio data with timestamp data to generate encoded fourth audio data, wherein a second audio frame of the encoded fourth audio data is associated with the first timestamp;
- sending, from the first component to a second component, the encoded fourth audio data;
- receiving, by the first component from the second component, wakeword boundary data including a second timestamp corresponding to a beginning of a wakeword and a third timestamp corresponding to an end of the wakeword;
- selecting, using the second timestamp and the third timestamp, a portion of the first energy data that corresponds to the wakeword;
- determining, using the portion of the first energy data, a second energy value representing an amount of energy corresponding to the wakeword;
- determining, by a remote system, that the second energy value is greater than a third energy value associated with a second device; and
- in response to the second energy value being greater than the third energy value, causing, by the remote system, the first device to perform an action.

2. The computer-implemented method of claim 1,
- determining a third energy value corresponding to a third audio frame of the fourth audio data, the third audio frame associated with the second timestamp;
- determining a fourth energy value corresponding to a fourth audio frame of the fourth audio data, the fourth audio frame associated with the third timestamp;
- determining a plurality of energy values between the second timestamp and the third timestamp, the plurality of energy values including the third energy value and the fourth energy value;
- determining, using the plurality of energy values, a fifth energy value corresponding to the wakeword; and
- generating, using at least the fifth energy value, a modified second gain value.

3. The computer-implemented method of claim 1, further comprising, by the second component:
- receiving, from the first component, the encoded fourth audio data;
- determining that the second audio frame of the encoded fourth audio data is associated with the first timestamp;
- storing a second association between the first timestamp and a first value;
- determining that a third audio frame of the encoded fourth audio data is associated with the second timestamp;
- storing a third association between the second timestamp and a second value;
- processing the encoded fourth audio data to determine that the beginning of the wakeword corresponds to the second value and that the end of the wakeword corresponds to a third value;
- determining, using the third association, that the beginning of the wakeword corresponds to the second timestamp;
- determining, using a fourth association, that the end of the wakeword corresponds to the third timestamp; and
- sending, from the second component to the first component, the wakeword boundary data including the second timestamp and the third timestamp.

4. A computer-implemented method, the method comprising:
- determining, by a device, audio data representing speech input received by the device;
- generating, by the device, first modified audio data using the audio data and a first gain value;
- generating, by the device, second modified audio data based at least in part on the audio data and a second gain value, the second gain value corresponding to wakeword detection;
- determining, by the device and using the second modified audio data, a portion of the second modified audio data that represents a wakeword;
- determining, by the device and based on the determining of the portion of the second modified audio data that represents the wakeword, a portion of the first modified audio data corresponding to the wakeword;
- determining, by the device, first data representing one or more characteristics of the portion of the first modified audio data; and
- sending, by the device, the first data to a remote device.

5. The computer-implemented method of claim 4, wherein determining the first data further comprises:
- determining a first energy value corresponding to the portion of the first modified audio data.

6. The computer-implemented method of claim 4, wherein the first gain value is associated with a type of the device, and the second modified audio data is generated by applying the second gain value to the first modified audio data.

7. The computer-implemented method of claim 4, wherein a first timestamp is encoded in least significant bits of a first audio frame of the second modified audio data, and a second timestamp is encoded in least significant bits of a second audio frame of the second modified audio data, and the method further comprises:
- determining that a beginning of the wakeword corresponds to the second audio frame of the second modified audio data; and
- determining, using the second timestamp, that the beginning of the wakeword corresponds to a third audio frame of the first modified audio data, the third audio frame associated with a beginning of the portion of the first modified audio data.

8. The computer-implemented method of claim 4, further comprising:
- determining that a first timestamp is associated with a first energy value, the first energy value corresponding to a first audio frame of the first modified audio data;
- determining that a second timestamp is associated with a second energy value, the second energy value corresponding to a second audio frame of the first modified audio data;

determining that a beginning of the portion of the first modified audio data corresponds to the second timestamp; and determining, using the second timestamp and the second energy value, a third energy value corresponding to the wakeword.

9. The computer-implemented method of claim 8, further comprising:

determining that an end of the portion of the first modified audio data corresponds to a third timestamp associated with a third audio frame of the first modified audio data; and determining a plurality of energy values between the second timestamp and the third timestamp, the plurality of energy values including the second energy value, wherein the third energy value is determined using the plurality of energy values.

10. The computer-implemented method of claim 4, further comprising:

determining that a first timestamp is associated with a first energy value, the first energy value corresponding to a first audio frame of the second modified audio data;

determining that a second timestamp is associated with a second energy value, the second energy value corresponding to a second audio frame of the second modified audio data;

determining that a beginning of the wakeword corresponds to the second timestamp; and determining, using the second timestamp and the second energy value, a third energy value corresponding to the wakeword.

11. The computer-implemented method of claim 10, further comprising:

determining that an end of the wakeword corresponds to a third timestamp associated with a third audio frame of the second modified audio data;

determining a plurality of energy values between the second timestamp and the third timestamp, the plurality of energy values including the second energy value, wherein the third energy value is determined using the plurality of energy values; and generating, using at least the third energy value, a modified second gain value.

12. The computer-implemented method of claim 4, wherein the second modified audio data is generated by a first component of the device, and determining the portion of the second modified audio data further comprises:

receiving, from the first component by a second component of the device, the second modified audio data;

determining, using the second modified audio data, that a beginning of the wakeword corresponds to a first audio frame of the second modified audio data and that an end of the wakeword corresponds to a second audio frame of the second modified audio data;

determining, using the first audio frame, that the beginning of the wakeword corresponds to a first timestamp generated by the first component;

determining, using the second audio frame, that the end of the wakeword corresponds to second timestamp generated by the first component; and sending, from the second component to the first component, second data including the first timestamp and the second timestamp.

13. The computer-implemented method of claim 4, wherein the first modified audio data includes a first representation of the speech input and the second modified audio data includes a second representation of the speech input.

14. A system comprising:

at least one processor; and memory including instructions operable to be executed by the at least one processor to cause the system to:

determine, by a device, audio data representing speech input received by the device;

generate, by the device, first modified audio data using the audio data and a first gain value;

generate, by the device, second modified audio data based at least in part on the audio data and a second gain value, the second gain value corresponding to wakeword detection;

determine, by the device and using the second modified audio data, a portion of the second modified audio data that represents a wakeword;

determine, by the device, a portion of the first modified audio data corresponding to the portion of the second modified audio data;

determine, by the device, first data representing one or more characteristics of the portion of the first modified audio data; and send, by the device, the first data to a remote device.

15. The system of claim 14, wherein the memory further comprises instructions that, when executed by the at least one processor, further cause the system to:

determine a first energy value corresponding to the portion of the first modified audio data.

16. The system of claim 14, wherein the first gain value is associated with a type of the device, and the second modified audio data is generated by applying the second gain value to the first modified audio data.

17. The system of claim 14, wherein a first timestamp is encoded in least significant bits of a first audio frame of the second modified audio data, a second timestamp is encoded in least significant bits of a second audio frame of the second modified audio data, and the memory further comprises instructions that, when executed by the at least one processor, further cause the system to:

determine that a beginning of the wakeword corresponds to the second audio frame of the second modified audio data; and determine, using the second timestamp, that the beginning of the wakeword corresponds to a third audio frame of the first modified audio data, the third audio frame associated with a beginning of the portion of the first modified audio data.

18. The system of claim 14, wherein the memory further comprises instructions that, when executed by the at least one processor, further cause the system to:

determine that a first timestamp is associated with a first energy value, the first energy value corresponding to a first audio frame of the first modified audio data;

determine that a second timestamp is associated with a second energy value, the second energy value corresponding to a second audio frame of the first modified audio data;

determine that a beginning of the portion of the first modified audio data corresponds to the second timestamp; and determine, using the second timestamp and the second energy value, a third energy value corresponding to the wakeword.

19. The system of claim 18, wherein the memory further comprises instructions that, when executed by the at least one processor, further cause the system to:

determine that an end of the portion of the first modified audio data corresponds to a third timestamp associated with a third audio frame of the first modified audio data; and determine a plurality of energy values between the second timestamp and the third timestamp, the plurality of energy values including the second energy value, wherein the third energy value is determined using the plurality of energy values.

20. The system of claim 14, wherein the memory further comprises instructions that, when executed by the at least one processor, further cause the system to:

determine that a first timestamp is associated with a first energy value, the first energy value corresponding to a first audio frame of the second modified audio data;

determine that a second timestamp is associated with a second energy value, the second energy value corresponding to a second audio frame of the second modified audio data;

determine that a beginning of the wakeword corresponds to the second timestamp; and determine, using the second timestamp and the second energy value, a third energy value corresponding to the wakeword.

* * * * *